United States Patent [19]

Turner et al.

[11] Patent Number: 4,475,966

[45] Date of Patent: Oct. 9, 1984

[54] METHOD AND APPARATUS FOR MANUFACTURING VIDEO DISC CADDY

[75] Inventors: Robert L. Turner, Morresville; John J. Prusak, Indianapolis, both of Ind.

[73] Assignee: RCA Corporation, New York, N.Y.

[21] Appl. No.: 517,169

[22] Filed: Jul. 25, 1983

[51] Int. Cl.³ .................... B23K 19/04; B29C 27/08
[52] U.S. Cl. ................................ 156/73.1; 156/217; 156/293; 156/443; 156/492; 156/580.1; 156/580.2
[58] Field of Search ................... 156/73.1, 217, 227, 156/293, 443, 492, 580.1, 580.2, 583.1; 206/312

[56] References Cited

U.S. PATENT DOCUMENTS

| | | | |
|---|---|---|---|
| 3,821,049 | 6/1974 | Gold | 156/73.1 |
| 3,832,775 | 9/1974 | Stahel et al. | 156/73.1 |
| 4,124,427 | 11/1978 | Vecchiott | 156/380.6 |
| 4,316,539 | 2/1982 | Torrington | 206/312 |

*Primary Examiner*—Michael Wityshyn

*Attorney, Agent, or Firm*—Paul J. Rasmussen; William H. Meise; Dilip A. Kulkarni

[57] ABSTRACT

The technique of forming a jacket by welding a pair of T-shaped side rails to a U-shaped enclosure comprises the steps of (1) inserting the U-shaped enclosure over a spacer plate, (2) clamping the U-shaped enclosure to the spacer plate, (3) inserting the flange portions of the T-rails between the side edge portions of the U-shaped enclosure, and (4) ultrasonically welding the side rails to the U-shaped enclosure to complete the assembly. According to a further feature of the invention, the clamping plates are fitted with tapered inserts at both ends to oppose the tendency of the finished jacket to collapse in the middle. Pursuant to still another aspect of the invention, the portion of the spacer plate near the open end of the U-shaped enclosure is provided with energy concentrating tips to direct a portion of ultrasonic energy to this region to ensure a good weld between the side rails and the U-shaped enclosure near its open end.

19 Claims, 15 Drawing Figures

METHOD AND APPARATUS FOR MANUFACTURING VIDEO DISC CADDY

This invention generally relates to a record package, and more particularly, to a technique for manufacturing the record package outer sleeve.

In certain systems, picture and sound signals are stored on a disc record in the form of physical undulations in a continuous spiral track disposed on the record surface. The variations in electrical capacitance between an electrode disposed on a record-engaging stylus and a conductive property of a turntable-supported record are sensed as the physical undulations on the record surface pass beneath the stylus tip. The capacitive variations are converted into electrical signals suitable for application to a conventional television receiver.

It is beneficial to enclose a video record in a caddy which comprises a record retaining spine removably located within an outer sleeve. The record retaining spine has an opening in which a record is received to form a record/spine assembly. The record retaining spine is provided with a pair of spaced apart locking fingers disposed at the opposite edges thereof to releasably secure the spine to the sleeve. The caddy sleeve is covered with a wrap-around label containing program information and graphics. For record loading, a full caddy is inserted into an input slot provided in the player along a pair of caddy guide rails. A record extraction mechanism disposed in the player removes the record/spine assembly from the sleeve when the sleeve is withdrawn to leave the record/spine assembly inside the player resting on a set of record receiving pads. The retained record is then transferred by a record handling mechanism to a turntable for playback. For record retrieval, the record is transferred back to the receiving pads, and an empty jacket is reinserted into the player to recapture the record/spine assembly.

There are several alternative techniques for manufacturing the outer caddy sleeve. The caddy sleeve, shown in U.S. Pat. No. 4,239,108, (Coleman et al.), comprises a pair of injection molded halves which are ultrasonically welded together. U.S. Pat. No. 4,316,539 (Torrington) discloses an alternative design where the caddy sleeve consists of a pair of inexpensive panels securely glued to a U-shaped, injection molded frame.

A copending U.S. patent application, Ser. No. 443,998, of the same inventors, discloses a novel technique for fabricating a folded caddy. The therein disclosed technique consists of heating the midsection of a flat extruded plastic sheet, bending the plastic sheet at the heated midsection to form a U-shaped enclosure, and then ultrasonically welding a pair of plastic, T-shaped side rails to the U-shaped enclosure to form the caddy sleeve.

In accordance with this invention, an improved method for ultrasonically welding a pair of T-shaped side rails to a U-shaped enclosure comprises the steps of (1) inserting the U-shaped enclosure over a substantially flat spacer plate having external dimensions corresponding to the internal dimensions of the caddy sleeve, (2) clamping the U-shaped enclosure between a pair of clamping plates to firmly secure the U-shaped enclosure against the spacer plate, (3) inserting the flange portions of the T-shaped side rails between the side edge portions of the U-shaped enclosure, and (4) transmitting ultrasonic energy to the side rails to weld the side rails to the U-shaped enclosure to form the jacket.

According to a further aspect of this invention, the U-shaped enclosure is prestressed during the welding operation in a manner that counters the tendency of the U-shaped enclosure to bow in the middle.

Pursuant to another feature of the instant invention, the trailing portion of the spacer plate is provided with a pair of narrow energy concentrating tips to direct a portion of ultrasonic energy to the regions between the ends of the side rails and the interior surfaces of the side portions of the U-shaped enclosure near the open end thereof to ensure a good and clean weld along the entire length of the side rails.

Figure 1:
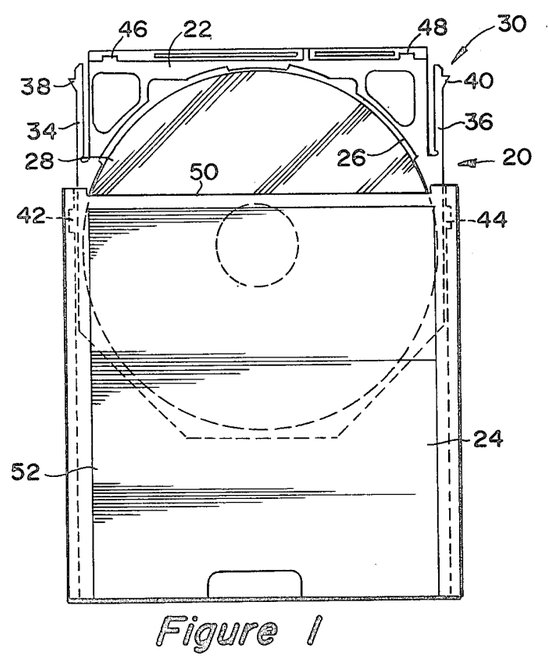
FIG. 1 depicts a plastic video disc caddy comprising an inner record retaining spine and an outer sleeve.
Figure 2:
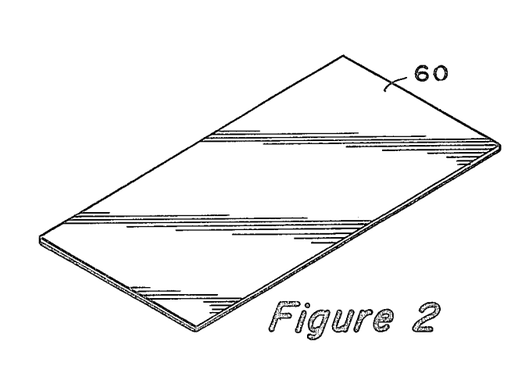
FIGS. 2–8 schematically illustrate the sequence of events involved in the fabrication of the outer caddy sleeve of FIG. 1.

The plastic video disc caddy 20, depicted in FIG. 1, consists of a planar injection-molded record retaining spine 22 removably enclosed in a flat outer sleeve 24 made in accordance with this invention. The retaining spine 22 has an opening 26 in which a centrally-apertured record 28 is received forming a record/spine assembly 30. Integrally molded with the spine 22 are spine locking fingers 34 and 36 for releasably securing the spine 22 in its sleeve 24. The spine locking fingers 34 and 36 are fitted with protruding elements 38 and 40 which are received in the respective recesses 42 and 44 provided in the sleeve 24 to hold the spine 22 in place. The spine 22 has cutouts 46 and 48 in which the respective spine latching members of a record extraction mechanism are received to secure the spine to the player, so that the record/spine assembly 30 is retained inside the player when the caddy sleeve 24 is withdrawn. The caddy sleeve 24 has a record access opening 50 in communication with a record enclosing cavity 52.

Figure 3:
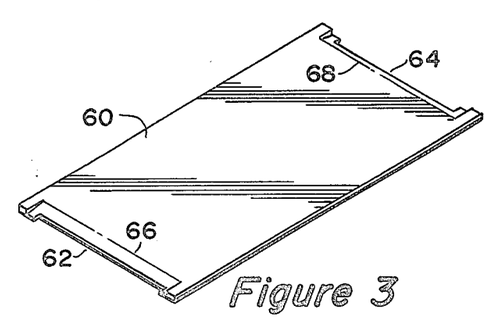

The overall construction sequence of the caddy sleeve 24 will now be explained in conjunction with FIGS. 2–8. A flat extruded polystyrene sheet 60 is trimmed to size. Illustrative dimensions of the plastic sheet, in inches, are 0.070 thick × 12.690 wide × 28.165 long. Any suitable material (e.g., medium impact polystyrene) is extruded into a flat sheet which is either cut into individual pieces or stored in a roll form for the subsequent die cutting and trimming operations. The flat sheet 60 is die cut at both ends to form cutouts 62 and 64 for reception of the front wall of the spine 22 such that the front edge of the spine is flush with the frot edge of the outer sleeve 24. The lead-in edges of the flat sheet 60 are beveled at both ends 66 and 68, as shown in FIG. 3, to facilitate insertion of the record/spine assembly 30 into the caddy sleeve 24. The bevels 66 and 68 are cold formed. The die cutting and beveling operations are performed simultaneously at a single station.

Figure 4:
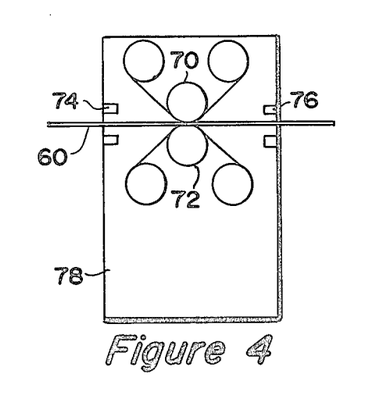

The recessed and beveled plastic sheet 60 is then cleaned by passing it through a set of cleaning rollers 70 and 72 depicted in FIG. 4. Any suitable cleaning cloth can be used—for example, wiping fabric made by 3M Company. The plastic sheet is passed through a set of antistatic bars 74 and 76 at both the feed end and the output end of the cleaning machine 78 to get rid of any accumulated electrostatic charges.

Figure 5:
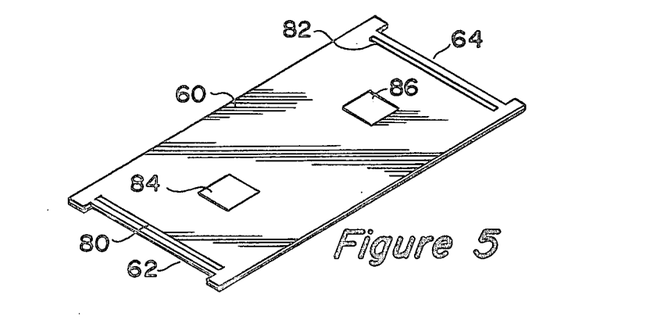

A pair of lip seal pads 80 and 82 and center pads 84 and 86 are then applied to the plastic sheet 60 in the manner shown in FIG. 5. The lip pads 80 and 82 serve to prevent scuffing and debris generation during record insertion and extraction. They also serve to keep dust and debris from entering into the record enclosing cavity 52. The center pads 84 and 86 protect the record 28 by providing soft sliding surfaces at the disc/caddy interfaces. The pads can be made from any suitable material—such as Sontara made by Dupont. The pads are covered with pressure sensitive adhesive on one side, and are die cut and firmly seated in place.

Figure 6:
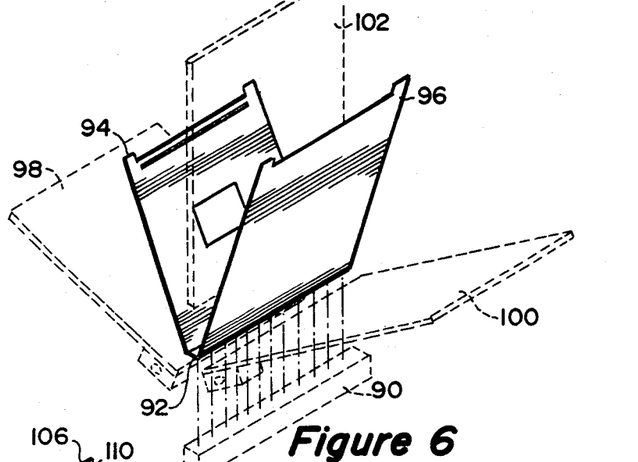

The infrared energy from a pair of line-focus heaters 90 is applied to a narrow folding section 92 disposed between the panel portions 94 and 96 of the plastic sheet 60 for a preset time (e.g., 3 to 4 seconds) in the manner diagrammatically shown in FIG. 6. The temperature of the plastic sheet 60 in the folding line region 92 is raised to about 325° F. A pair of water-cooled folding plates 98 and 100 fold the plastic sheet 60 at the heated folding line 92 to cause the panel portions 94 and 96 to wrap around a spacer plate 102 to define a U-shaped enclosure 104 illustrated in FIG. 7. The temperature of the water circulated through the folding plates 98 and 100 is chilled to approximately 55° F. The folding plates 98 and 100 are held in the folded-up position for about 4 to 5 seconds, and then shifted back to the flat position. The thickness of the spacer plate 102 defines the caddy internal clearance (e.g., 0.110±0.040 inches).

Figure 7:
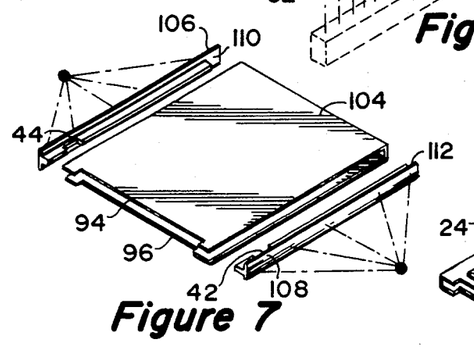
Figure 8:
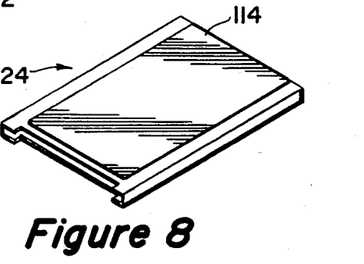

As schematically shown in FIG. 7, a pair of T-shaped side rails 106 and 108 are ultrasonically welded to the enclosure 104 to form the caddy sleeve 24 in accordance with this invention. The side rails 106 and 108 are equipped with notches 110 and 112 at their respective ends to accommodate the narrow midportion 92 of the enclosure 104. The caddy sleeve 24 is then covered with a heat-seal, wrap-around label 114 having appropriate graphics as indicated in FIG. 8. The label 114 is made from any suitable material (e.g., 6-point Tyvec manufactured by Dupont).

Figure 9:
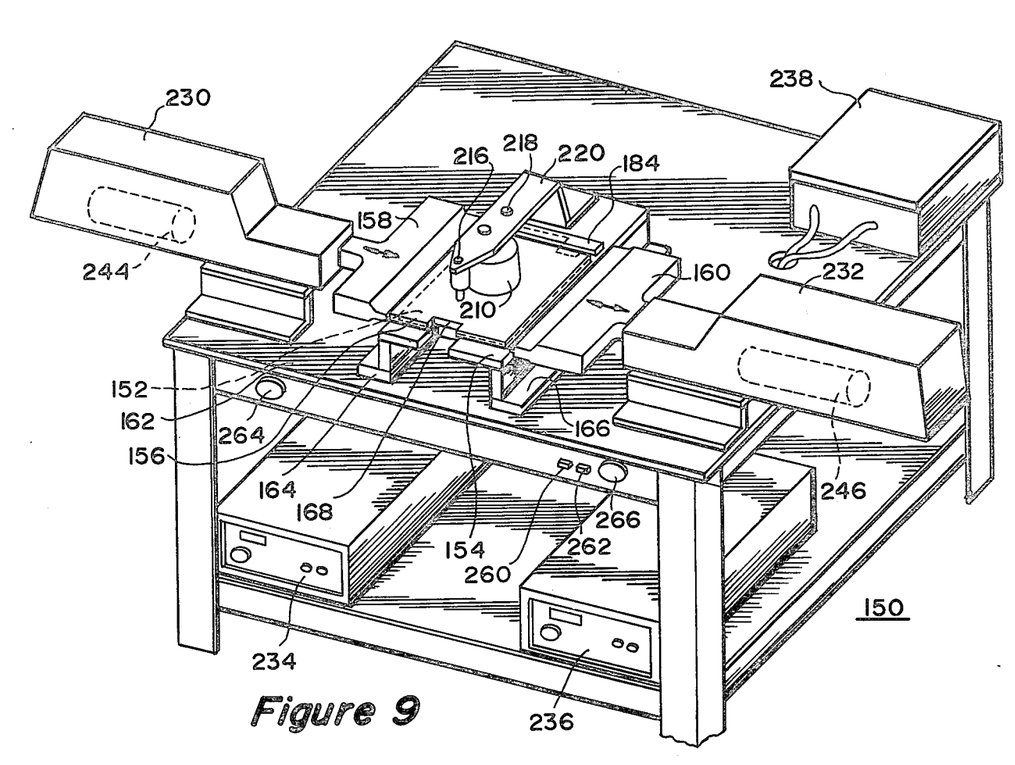
FIGS. 9 and 10 show the caddy welding machine used for ultrasonically welding the T-shaped side rails to the U-shaped enclosure to form the FIG. 1 caddy sleeve according to the principles of the subject invention.
Figure 10:
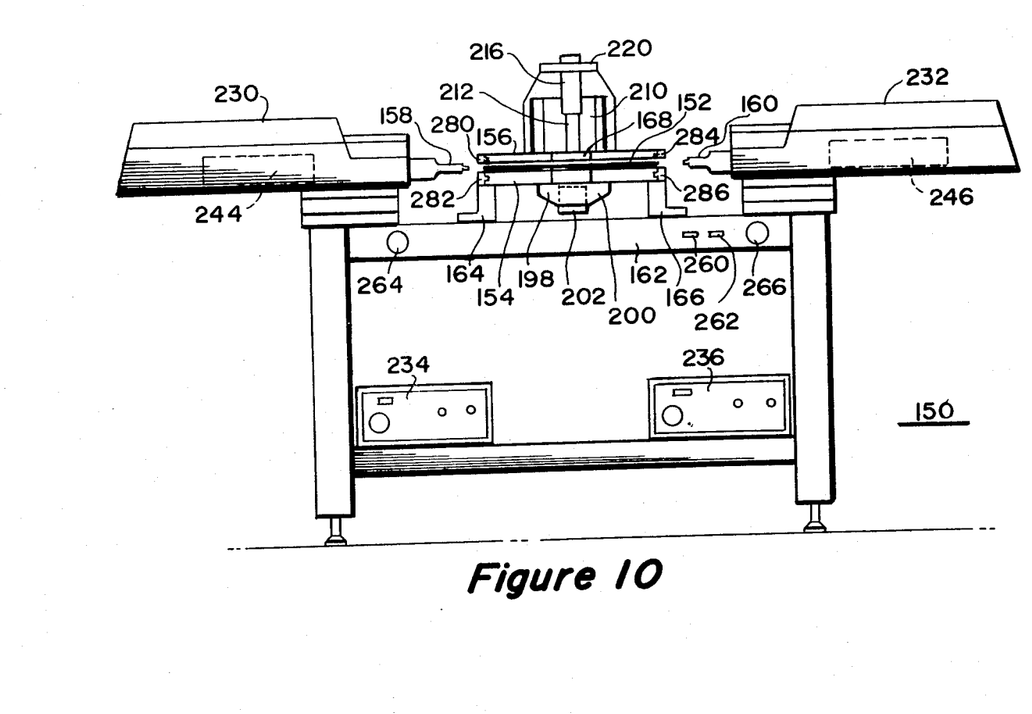

Shown in FIGS. 9 and 10 is an ultrasonic welding machine 150 pursuant to this invention. The welding machine 150 comprises (1) a substantially flat spacer plate 152 for providing internal support to the U-shaped enclosure 104, (2) a pair of clamping plates 154 and 156 disposed about the spacer plate for securely clamping the U-shaped enclosure to the spacer plate during the welding operation, and (3) a pair of welding horns 158 and 160 for applying ultrasonic energy to the T-shaped side rails to weld them to the U-shaped enclosure. The lower clamping plate 154 is fixedly mounted to the base 162 of the machine by means of a pair of sturdy brackets 164 and 166. The stationary lower clamping plate 154 extends slightly beyond the top clamping plate 156, as can be seen more clearly in FIG. 11, to guide the insertion of the U-shaped enclosure between the clamping plates. The clamping plates 154 and 156 are provided with cutouts, shown at 168, to provide access to the U-shaped enclosure 104 for insertion and removal.

Figure 12:
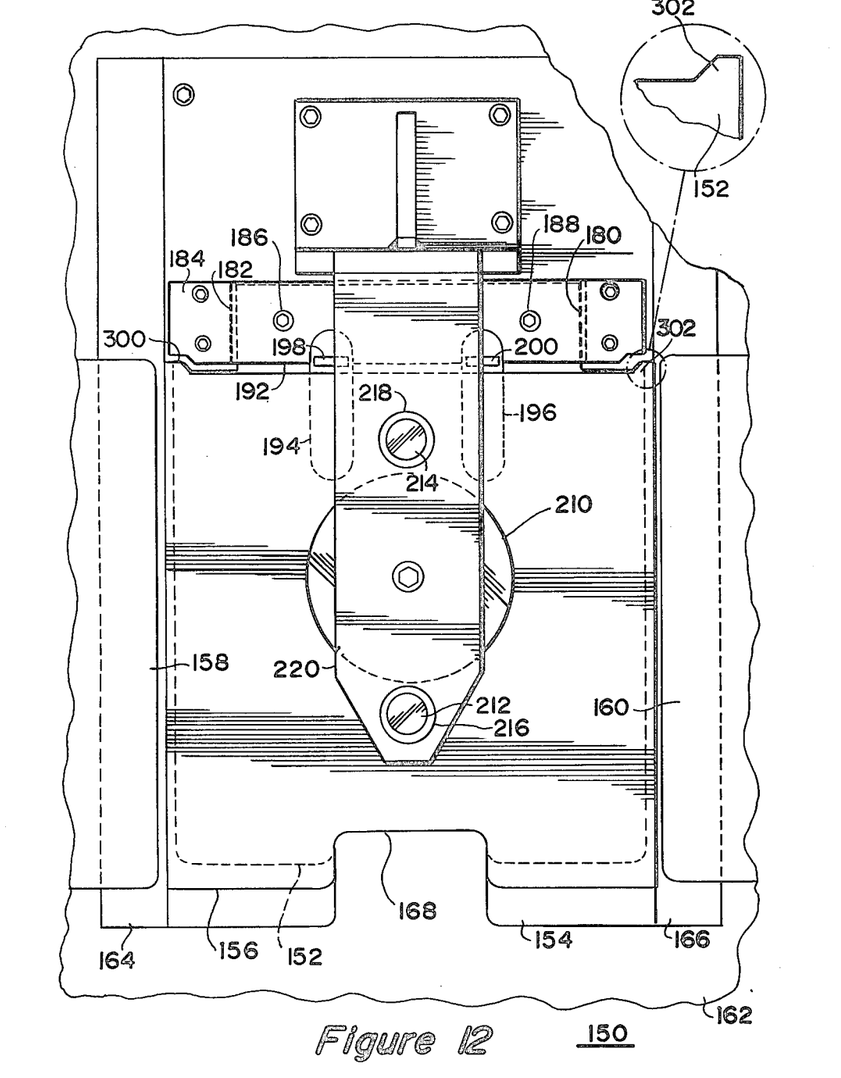

As depicted in FIG. 12, the spacer plate 152 has a reduced neck portion 180 at the back end thereof which is loosely received in a cutout 182 provided in a bridge-shaped member 184 fixedly mounted on the stationary bottom clamping plate 154. The spacer plate 152 is free to float up and down in the cutout 182 in response to the insertion and withdrawal of the U-shaped enclosure. To guide the vertical motion of the spacer plate 152, the bottom clamping plate 154 is fitted with a pair of guide pins 186 and 188 which are passed through the respective openings in the spacer plate. The clearance between the guide pins 186 and 188 and the respective openings in the spacer plate 152 is sufficient to allow free vertical motion of the spacer plate between the clamping plates 154 and 156 while maintaining the registration of the spacer plate with respect to the clamping plates.

The exterior surfaces of the floating spacer plate 152 are dimensioned to correspond to the interior surfaces of the caddy jacket 24. The leading edge of the spacer plate 152 is beveled as indicated at 190 in FIG. 11 to facilitate the insertion of the U-shaped enclosure 104 over the spacer plate. As previously stated, the spacer plate 152, about 0.110 inches thick, provides internal support to the U-shaped enclosure 104 when it is clamped between the clamping plates 154 and 156. The front wall 192 of the bridge-shaped member 184 is contoured to correspond to the leading surfaces of the U-shaped enclosure 104 to cause it to be centered with respect to the clamping plates 154 and 156 as the enclosure is fully inserted into the welding machine 150.

Figure 11:
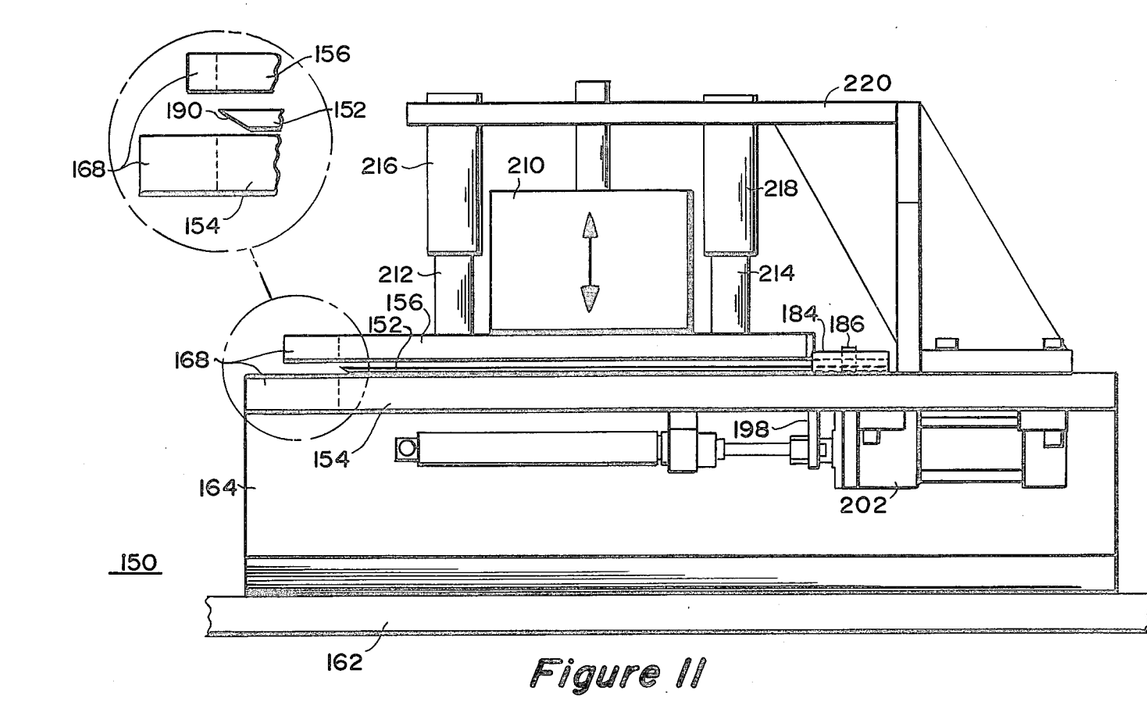
FIGS. 11–13 give further construction particulars of the caddy welding machine of FIGS. 9 and 10.

Normally, the floating spacer plate 152 rests on the bottom clamping plate 154. When the U-shaped enclosure 104 is inserted between the clamping plates 154 and 156, the tapered front edge of the lower panel of the enclosure slips underneath the beveled leading edge of the spacer plate 152 to lift the spacer plate up to the position between the two panels of the enclosure. When the finished sleeve 24 is withdrawn after the welding operation, the spacer plate 152 gravitates back to its original position.

The bottom clamping plate 154 and the spacer plate 152 are provided with a pair of elongated openings 194 and 196 for accommodating the respective caddy kicker blades 198 and 200. A selectively-actuated air cylinder 202 operates the kicker blades 198 and 200 to eject the finished jacket 24 out for removal.

The top clamping plate 156 is attached to an air cylinder 210 for movement between a raised position to allow the insertion of the U-shaped enclosure 104 over the spacer plate 152, and a lowered position to securely press the U-shaped enclosure against the spacer plate. Disposed on the top clamping plate 152 are a pair of guide pins 212 and 214 which are slidably received in the respective bushings 216 and 218 suspended from a rigid overhead bracket 220. The overhead bracket 220 further serves to support the air cylinder 210.

The welding horns 158 and 160 are energized by the respective actuators 230 and 232, which are, in turn, coupled to their power supplies 234 and 236. The power supplies 234 and 236 are connected to a control box 238. Each of the actuator units 230 and 232 includes a converter assembly for converting high frequency electrical oscillations into mechanical oscillations, and a booster assembly for selectively amplifying the mechanical oscillations for application to the respective welding horns 158 and 160. The flange portions 240 and 242 of the T-shaped side rails 106 and 108 are slipped between the side edge portions of the U-shaped enclosure 104 after the U-shaped enclosure is clamped to the spacer plate 152 in the manner shown in FIG. 13. The back walls of the side rails 106 and 108 are guided by the welding faces of the respective welding horns 158 and 160. The welding horns 158 and 160 are then gradually driven in, in the fashion shown in FIGS. 14 and 15, by a pair of actuator-mounted air cylinders 244 and 246. The ultrasonic vibrations transmitted to the T-shaped side rails 106 and 108 melt the plastic in the regions of the respective step portions 248, 250, 252 and 254 of the T-rails to fuse the T-rails to the interior surfaces of the side edge portions of the U-shaped enclosure 104 to complete the jacket assembly 24 (See U.S. patent application, Ser. No. 488,298, of Turner for further construction details of the side rails 106 and 108.)

To recapitulate, the sequence of steps involved in the fabrication of the jacket 24 are as set forth below.

A switch 260 is operated to energize the air cylinder 210 to lift the top clamping plate 156 up.

Another switch 262 is actuated to cause the air cylinder 202 to retract the kicker elements 198 and 200.

The U-shaped enclosure 104 is inserted over the spacer plate 152, and centered sideways, for example, by using a guide (not shown).

The switch 260 is operated to lower the top clamping plate 156 to securely clamp the U-shaped enclosure to the spacer plate 152.

Figure 13:
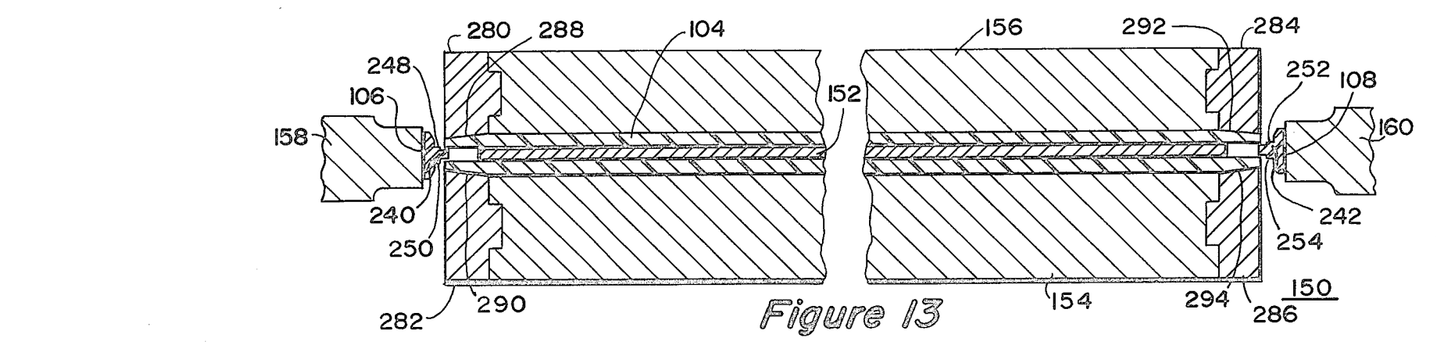
Figure 14:
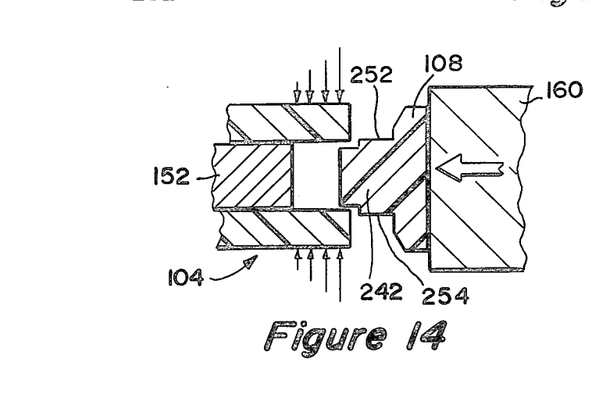
FIGS. 14 and 15 portray the caddy welding sequence.
Figure 15:
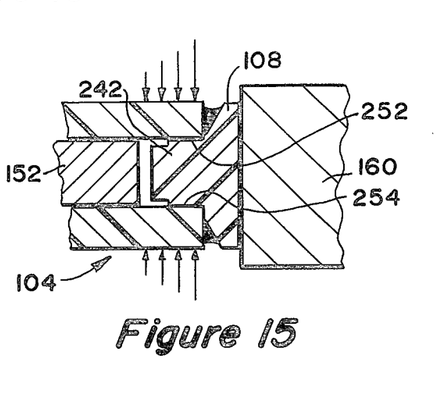

The flange portions 240 and 242, of the T-shaped side rails 106 and 108 are inserted between the side edge portions of the U-shaped enclosure 104 as illustrated in FIGS. 13 and 14. The back walls of the T-rails 106 and 108 are guided by the welding surfaces of the horns 158 and 160 during insertion.

A pair of palm buttons 264 and 266 are depressed to cause the air cylinders 244 and 246 to advance the respective actuators 230 and 232, and to energize the welding horns 158 and 160. The simultaneous application of ultrasonic energy and pressure cause the step portions 248-254 of the T-rails 106 and 108 to melt and fuse to the U-shaped enclosure 104 to form the jacket assembly 24. The welding horns 158 and 160 are applied to the T-rails for a preset time (e.g., 0.6 to 0.8 seconds), and the actuators 230 are then automatically withdrawn. The need to operate both buttons 264 and 266 to initiate the welding cycle protects the operator's hands from accidental injury.

The switch 260 is actuated to lift the top clamping plate 156 up.

The switch 262 is operated to eject the finished jacket 24 out for removal.

As previously indicated, the jacket 24 has a tendency to collapse in the middle, which is undesirable because of the risk of damaging the enclosed record during its insertion and extraction. To overcome this problem, the top and bottom clamping plates 154 and 156 are fitted with tapered inserts 280, 282, 284 and 286, as depicted in FIG. 13, in accordance with a further aspect of the present invention. The spacing between the interior surfaces 288, 290, 292 and 294 of the tapered inserts 280-286 is reduced toward the outermost edges of the U-shaped enclosure 104 to increase the pressure between the flange portions 240 and 242 of the side rails 106 and 108 and the respective interior surfaces of the side edge portions of the U-shaped enclosure 104 toward the side edges. Such prestressing of the U-shaped enclosure 104 near the side edges thereof during the welding operation counters the inclination of the jacket 24 to buckle in the middle, and, in turn, serves to hold the tolerances on the caddy internal clearance (i.e., 0.110±0.040 inches). Typically, the height of each insert is increased by about 0.003 inches over a width of about 0.375 inches to produce the desired level of prestressing during the welding operation.

Pursuant to still another feature of the subject invention, the trailing portion of the spacer plate 152 is provided with narrow extensions 300 and 302 near the open end of the U-shaped enclosure 104 as indicated in FIG. 12. The narrow extensions 300 and 302 of the spacer plate 152 serve to focus a portion of ultrasonic energy in the respective regions between the ends of the T-rails 106 and 108 and the interior surfaces of the side edge portions of the U-shaped enclosure 104 near its open end to produce a good and uniform weld over the entire length of the side rails.

The spacer plate 152 and the top and bottom clamping plates 154 and 156 are made from aluminum stock. It was found that aluminum has the desired mechanical properties to produce good and clean welds. The welding horns 158 and 160 are made from any suitable material-such as titanium, chrome-plated aluminum, etc.

It is possible to combine the operation of the two switches 260 and 262 into one three position switch. When the combined switch is disposed in the lower most position, the top clamping plate 156 is lowered. When the three position switch is raised to the middle position, the top clamping plate 156 is lifted. When this switch is raised all the way up, the kicker blades 198 and 200 are advanced to eject the finished caddy out. The idea here is to avoid the possibility of advancing the kicker blades 198 and 200 while the top clamping plate 156 is down.

The specifications of certain components of the welding machine 150 are given below.

Air cylinder 202 for operating the kicker blades 198 and 200—Atlas Co., Model No. A-SL.

Air cylinder 210 for operating the top clamping plate 156—Fabco Co., Model No. C-1221.

Actuators 230 and 232 of the welding horns 158 and 160—Branson 800 Series, Model No. 871.

Power supplies 234 and 236—Branson 800 Series, Model No. 187P—1500 watts.

The welding machine 150 in accordance with the subject invention produces good and uniform welds between the side rails 106 and 108 and the U-shaped enclosure.

What is claimed is:

1. Method of fabricating a plastic jacket having an edge opening by ultrasonically welding a pair of T-sectioned side rails to a U-shaped enclosure; each of said side rails including a rib portion having an intermediate, perpendicularly-disposed flange portion; said U-shaped enclosure having a pair of oppositely-disposed panels interconnected along one edge thereof; said method comprising the steps of:
   (A) inserting said U-shaped enclosure over a substantially flat spacer plate having external dimensions corresponding to the internal dimensions of said jacket;
   (B) clamping said U-shaped enclosure between a pair of clamping plates to firmly hold said U-shaped enclosure against said spacer plate;
   (C) inserting said flange portions of said T-sectioned side rails between the side edge portions of said U-shaped enclosure; and (D) applying ultrasonic energy to said side rails to weld said side rails to said U-shaped enclosure to form said jacket.

2. The method as set forth in claim 1 further including the step of centering said U-shaped enclosure in respect of said clamping plates prior to said clamping of said enclosure to said spacer plate.

3. The method as defined in claim 1 further including the step of prestressing said U-shaped enclosure during said welding step in a manner that counters the tendency of said U-shaped enclosure to bow in the middle.

4. The method as set forth in claim 3 wherein said prestressing of said U-shaped enclosure is achieved by decreasing the spacing between said clamping plates toward the side edges of said U-shaped enclosure to increase the pressure between said side edge portions of said U-shaped enclosure and said flange portions of said T-sectioned side rails toward said side edges of U-shaped enclosure during said welding operation in order to oppose the tendency of said jacket to collapse in the middle.

5. The method as defined in claim 4 wherein said decreased spacing between said clamping plates toward said side edges of sid U-shaped enclosure is accomplished by fitting said clamping plates with tapered inserts forming mutually concave inner faces in conjunction with the intermediate portions of said clamping plates.

6. The method as set forth in claim 1 further including the step of concentrating a portion of ultrasonic energy on the respective regions between the ends of said side rails and the interior surfaces of the side edge portions of said U-shaped enclosure disposed near said edge opening of said jacket to assure a good weld near said ends of said side rails.

7. The method as defined in claim 6 wherein said concentration of energy near said ends of said side rails is achieved by providing the trailing portion of said spacer plate near said edge opening of said jacket with narrow energy concentration tips to obtain a good weld between said side rails and said U-shaped enclosure along the entire length of said side rails.

8. The method as set forth in claim 1 wherein the leading portion of said spacer plate subject to engagement with said interconnected edge of said U-shaped enclosure is beveled to guide the insertion of said U-shaped enclosure over said spacer plate.

9. The method as defined in claim 1 wherein said application of ultrasonic energy to said side rails is achieved by bringing a pair of welding horns to bear upon the respective one of said T-sectioned side rails.

10. The method as outlined in claim 1 wherein said U-shaped enclosure and said side rails are made of medium impact polystyrene plastic.

11. The method of claim 1 wherein said spacer plate is made from aluminum stock.

12. Apparatus for fabricating a plastic jacket having an edge opening by ultrasonically welding a pair of T-sectioned side rails to a U-shaped enclosure; each of said side rails including a rib portion having an intermediate, perpendicularly-disposed flange portion; said U-shaped enclosure having a pair of oppositely-disposed panels interconnected along one edge thereof; said apparatus comprising:
(A) a substantially flat spacer plate having external dimensions corresponding to the internal dimensions of said jacket for supporting said U-shaped enclosure during fabrication;
(B) a pair of clamping plates disposed about said spacer plate; said clamping plates securely pressing said U-shaped enclosure against said spacer plate; and
(C) a pair of welding horns movably mounted for motion between the respective retracted positions and advanced positions; said welding horns allowing the insertion of said flange portions of said T-sectioned side rails between the side edge portions of said U-shaped enclosure when occupying their respective retracted positions; said welding horns transmitting ultrasonic energy to said side rails to weld them to said enclosure to form said jacket upon disposition thereof at their respective advanced positions.

13. The apparatus as set forth in claim 12 wherein the spacing between said clamping plates decreases toward the side edges of said U-shaped enclosure to increase the pressure between said side edge portions of said U-shaped enclosure and said flange portions of said T-sectioned side rails toward said side edges of U-shaped enclosure during said welding operation in order to oppose the tendency of said jacket to bow in the middle.

14. The apparatus as defined in claim 13 wherein said decreased spacing between said clamping plates toward said side edges of said U-shaped enclosure is achieved by equipping said clamping plates with tapered inserts forming mutually concave inner surfaces in conjunction with the midportions of said clamping plates.

15. The apparatus of claim 12 wherein the trailing portion of said spacer plate disposed near said edge opening of said jacket is fitted with narrowed energy concentration tips for focussing a portion of ultrasonic energy on the respective regions between the ends of said side rails and the side edge portions of said U-shaped enclosure to assure a good weld near said ends of said side rails.

16. The apparatus as outlined in claim 12 wherein the leading portion of said spacer plate subject to engagement with said interconnected edge of said U-shaped enclosure is beveled to facilitate the insertion of said U-shaped enclosure over said spacer plate.

17. The apparatus as defined in claim 12 wherein said spacer plate is made of aluminum.

18. The apparatus as set forth in claim 12 wherein one of said clamping plates is fixedly mounted and the other of said clamping plates is reciprocably mounted with respect to said fixedly-mounted clamping plate; wherein said spacer plate sandwiched between said clamping plates is free to move toward and away from said reciprocably-mounted clamping plate in response to the insertion and extraction of said U-shaped enclosure.

19. The apparatus as defined in claim 18 wherein said reciprocably-mounted clamping plate is selectively operated by an air-actuated cylinder.

* * * * *